(12) United States Patent
Lee

(10) Patent No.: US 7,299,196 B2
(45) Date of Patent: Nov. 20, 2007

(54) PRESENT MESSENGER SERVICE SYSTEM AND METHOD OF OPERATING THE SAME

(75) Inventor: Ki Kuk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/907,593

(22) Filed: Jul. 19, 2001

(65) Prior Publication Data

US 2002/0010653 A1    Jan. 24, 2002

(30) Foreign Application Priority Data

Jul. 19, 2000    (KR) .............................. 2000-41412

(51) Int. Cl.
    *G06Q 30/00*    (2006.01)
(52) U.S. Cl. .................. 705/26; 705/27; 709/200; 709/206; 707/1; 707/9; 707/10
(58) Field of Classification Search .................. 705/26, 705/27; 709/200, 206; 707/1, 9, 10
    See application file for complete search history.

(56) References Cited

U.S. PATENT DOCUMENTS

| | | | | |
|---|---|---|---|---|
| 5,845,267 | A * | 12/1998 | Ronen | 705/40 |
| 6,128,624 | A * | 10/2000 | Papierniak et al. | 707/104.1 |
| 6,154,738 | A * | 11/2000 | Call | 707/4 |
| 6,321,211 | B1 * | 11/2001 | Dodd | 705/26 |
| 6,418,441 | B1 * | 7/2002 | Call | 707/10 |
| 6,760,711 | B1 * | 7/2004 | Gillett et al. | 705/64 |
| 2001/0049634 | A1 * | 12/2001 | Stewart | 705/26 |
| 2002/0004753 | A1 * | 1/2002 | Perkowski | 705/26 |
| 2002/0010638 | A1 * | 1/2002 | Fischer | 705/26 |
| 2002/0042830 | A1 * | 4/2002 | Bose et al. | 709/230 |
| 2003/0009392 | A1 * | 1/2003 | Perkowski | 705/26 |
| 2003/0071724 | A1 * | 4/2003 | D'Amico | 340/506 |

FOREIGN PATENT DOCUMENTS

EP    0945813 A2 *    9/1999

OTHER PUBLICATIONS

Aldridge et al., "Secutiy considerations of doing business via the Internet: cautions to be considered", Internet Research, vol. 7 No. 1, pp. 9-15, 1997.*
Kalin, S., "Support service for remote users of online public access catalogs", RQ, vol. 31 No. 2, p. 197, Winter 1991.*

* cited by examiner

*Primary Examiner*—F. Zeender
*Assistant Examiner*—Christopher Buchanan
(74) *Attorney, Agent, or Firm*—Ked & Associates, LLP

(57) ABSTRACT

Disclosed is a present messenger service system and method of operating the same including a DB storing information of various products, a web server connected with the DB and displaying various information in accordance with a demand of the customer, a proposal program established in the web server, a message transmission server connected with the web server, transferring a message transferred from the web server to a corresponding receiving party and established in accordance with a communication means of the present provider, a gateway server, a relay server and the like, whereby a present request message of the customer is correctly transferred to the present provider regardless of time. Thus, an information provision to a final present delivery are carried out in order.

9 Claims, 14 Drawing Sheets

PRESENT MESSENGER SERVICE SYSTEM AND METHOD OF OPERATING THE SAME

BACKGROUND OF THE INVENTION

1. Field of the Invention

The present invention relates to a present messenger, and more particularly, to a present messenger service system and method of operating the same, when a customer proposes to receive a product as a present, which enables to transfer an advertisement of the proposed product and a message of the customer to a proposed person.

2. Background of the Related Art

Generally, a present messenger service means that, when a customer wants to receive a present on a special memorial day, a proposed person(hereinafter called "present provider") is provided with a corresponding request message as well as a provision of the product is accomplished as soon as the present provider receives the message.

FIG. 1 shows schematically the above-mentioned system established to carry out the present messenger service.

Referring to FIG. 1, a conventional present messenger system mainly includes a customer PC 10 owned by a customer requesting a present and a network 30 owned by a present messenger service provider 30 informing a present provider PC 20 of the product requested by the customer and its information.

In this case, the network of the present messenger service provider is constructed with a web server 31 for guiding the corresponding site and a mail server 32 transferring the contents of the present requested by the customer PC 10 to the present provider PC 20.

And, a mail carried by the mail server 32 provides information of a reply of the present provider by a returning mail.

The operation procedures of the service managed by the above-established present messenger service provider is as follows.

FIG. 2 illustrates a schematic flow chart of the operation procedures of the system according to FIG. 1. And, FIGS. 3A to FIGS. 3C illustrate constructions of web pages during the operation of a general present messenger service.

Referring to FIG. 3A, after having accessed to a corresponding web site managed by a present messenger service provider through the customer PC 10, a customer searches various products advertised by a web page of the web site (S1). For instance, the customer enables to select a product wanted by himself by searching product groups "a" classified by functions of electronic products respectively and product sub-directories "b" belonging to the respective product groups "a".

Referring to FIG. 3B, the customer enables to purchase the selected product by himself or select a present messenger service to receive the present for commemorating an anniversary or a special day. If the present messenger service is selected, various input blanks, as shown in FIG. 3C, are displayed on a screen.

In this case, the customer inputs the required information to the corresponding input blanks such as "name of a message receiver", "e-mail address of the message receiver", "e-mail address of a message sender", "transfer message" and the like (S2).

In this case, the "receiver" is a present provider to whom the customer wants to request the present.

And, the customer selects a transmission after having inputted to the input blank of the "transfer message" with his home address, whereby the message containing the above information is transferred to a mailbox of the present provider (S3).

Then, the present provider buys the product by paying a purchase price of the corresponding present provided that he agrees to the provision of the requested present by ascertaining the transmitted mail (S4).

Finally, the purchased product is delivered to the customer's address by the present messenger service provider (S5).

In this case, the cost of the product to be presented is paid by the present provider through a payment method such as a credit card, automatic account transaction or the like.

Unfortunately, the operation method of the present messenger service, which is constructed with e-mails simply, according to the related art needs to have the present provider check his mail at all times so as to bring out the result.

Specifically, delivery date becomes overdue if the present provider fails to check his mails on and off. Therefore, various complain is made by the customer.

Moreover, the present messenger service according to the related art provides only the present provider with the information, thereby failing to gain special advertisement effects.

Further, even though the present provider receives the message through the above-mentioned service, when agreeing to and carrying out the present request, he has to select the corresponding product by gaining access to the corresponding site first as well as make a delivery order later. Thus, the related art causes inconvenience to the present provider.

SUMMARY OF THE INVENTION

Accordingly, the present invention is directed to a present messenger service system and method of operating the same that substantially obviates one or more problems due to limitations and disadvantages of the related art.

An object of the present invention is to provide a present messenger service system and method of operating the same which enables to transfer the information requested by a customer exactly to a present provider anytime.

Another object of the present invention is to provide a present messenger service system and method of operating the same enables to improve the sales by having a present provider make an order as soon as the present provider receives a message of a present request.

In order to achieve the above objectives, a present messenger service system and method of operating the same according to the present invention is embodied in various forms in accordance with the communication means of a present provider.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a present messenger service system includes a DB storing information of various products, a web server connected with the DB, the web server established to gain access to a customer PC, the web server displaying the information of the various products stored in the DB in accordance with a demand of the customer, a proposal program established in the web server, the proposal program providing options enabling to select whether the customer purchases the product or receives the product as a present when the customer selects the product, a message transmission server connected with the web server, the message transmission server transfers a message transferred from the web server to a present provider PC designated by the customer, and a temporary message storage DB connected with the message transfer server, the temporary message storage DB storing the message until a power of the present provider PC becomes on when the power of the present provider PC is off.

In another aspect of the present invention, a method of operating a present messenger service system includes an information providing step in which a web server provides information of respective products through a web page when a customer gains access to the web server of a present messenger service provider using a personal internet access means, a verification step in which a proposal program of the web server verifies whether the customer purchases the product in direct or receives the product as a present when the customer selects one of the respective products displayed on the web page, an information input request step in which the web server requests the customer to input a personal identification address of a messenger service for which a present provider enters and a simple message to be transferred to the present provider when the customer wants to receive the product as the present, a message transmission step in which a message transmission server of the present messenger service provider transmits a message to a present provider PC when the customer finishes inputting information of the present provider and the simple message, and a present delivery step in which the present messenger service provider delivers the product to the customer requesting the present when the present provider replies an agreement of a present provision after a verification of the message transferred through the present provider PC.

In a further aspect of the present invention, a present messenger service system includes a DB storing information of various products, a web server connected with the DB, the web server established to gain access to a customer PC, the web server displaying the information of the various products stored in the DB in accordance with a demand of the customer, a proposal program established in the web server, the proposal program providing options enabling to select whether the customer purchases the product or receives the product as a present when the customer selects the product, and a gateway server in connection with the web server for WAP(wireless application protocol) transferring a message requested through the web server to a mobile terminal of a present provider designated by the customer using a mobile communication network or a wireless communication network.

In another further aspect of the present invention, a method of operating a present messenger service system includes an information providing step in which a web server provides information of respective products through a web page when a customer gains access to the web server of a present messenger service provider using a personal internet access means, a verification step in which a proposal program of the web server verifies whether the customer purchases the product in direct or receives the product as a present when the customer selects one of the respective products displayed on the web page, an information input request step in which the web server requests the customer to input information of a mobile terminal of a present provider and a simple message to be transferred to the present provider when the customer wants to receive the product as the present, a message transmission step in which the present messenger service provider transmits a message to the mobile terminal of the present provider when the customer finishes inputting information of the present provider and the simple message, and a present delivery step in which the present messenger service provider delivers the product to the customer requesting the present when the present provider replies an agreement of a present provision after a verification of the message transferred through the mobile terminal of his own.

In another further aspect of the present invention, a present messenger service system includes a DB storing information of various products, a web server connected with the DB, the web server established to gain access to a customer PC, the web server displaying the information of the various products stored in the DB in accordance with a demand of the customer, a proposal program established in the web server, the proposal program providing options enabling to select whether the customer purchases the product or receives the product as a present when the customer selects the product, a relay server relaying a message transferred through the web server to an web-TV of a present provider designated by the customer.

In another further aspect of the present invention, a method of operating a present messenger service system includes an information providing step in which a web server provides information of respective products through a web page when a customer gains access to the web server of a present messenger service provider using a personal internet access means, a verification step in which a proposal program of the web server verifies whether the customer purchases the product in direct or receives the product as a present when the customer selects one of the respective products displayed on the web page, an information input request step in which the web server requests the customer to input information of a web-TV of a present provider and a simple message to be transferred to the present provider when the customer wants to receive the product as the present, a message relay step in which the web server transfers the information of the web-TV and a message to a relay server when the customer finishes inputting information of the present provider and the simple message, a message transmission step in which the relay server verifies a corresponding address(TCP/IP: transmission control protocol/internet protocol) of the web-TV of the present provider so as to display the message on the web-TV of the present provider, and a present delivery step in which the present messenger service provider delivers the product to the customer requesting the present when the present provider replies an agreement of a present provision after a verification of the message transferred through the web-TV of his own.

Accordingly, a present messenger service system and method of operating the same according to the present invention enables to receive the message of the customer requesting the present since the present messenger service is carried out not only by the e-mail in the related art but also by various communication means on real-time. Accordingly, the present invention enables the message to be transferred stably and improves the credibility of the customer by ascertaining the message through various communication means without having the present provider check his mail.

As the message is carried through the means available for bi-directional communication, a present messenger service system and method of operating the same according to the present invention enables to make an order for the corresponding present as soon as receives the message. Therefore, the present provider feels convenience for providing the present and the sales of the present messenger service provider rise because of the convenience of the present provision order.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
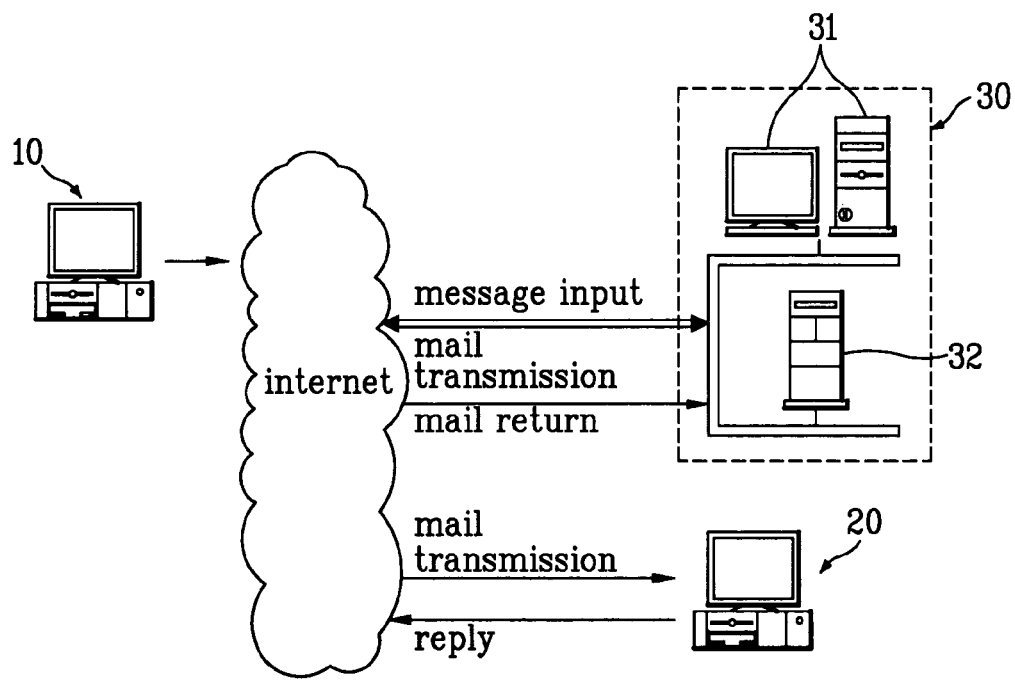
FIG. 1 illustrates schematically a general system established to carry out the present messenger service.
Figure 2:
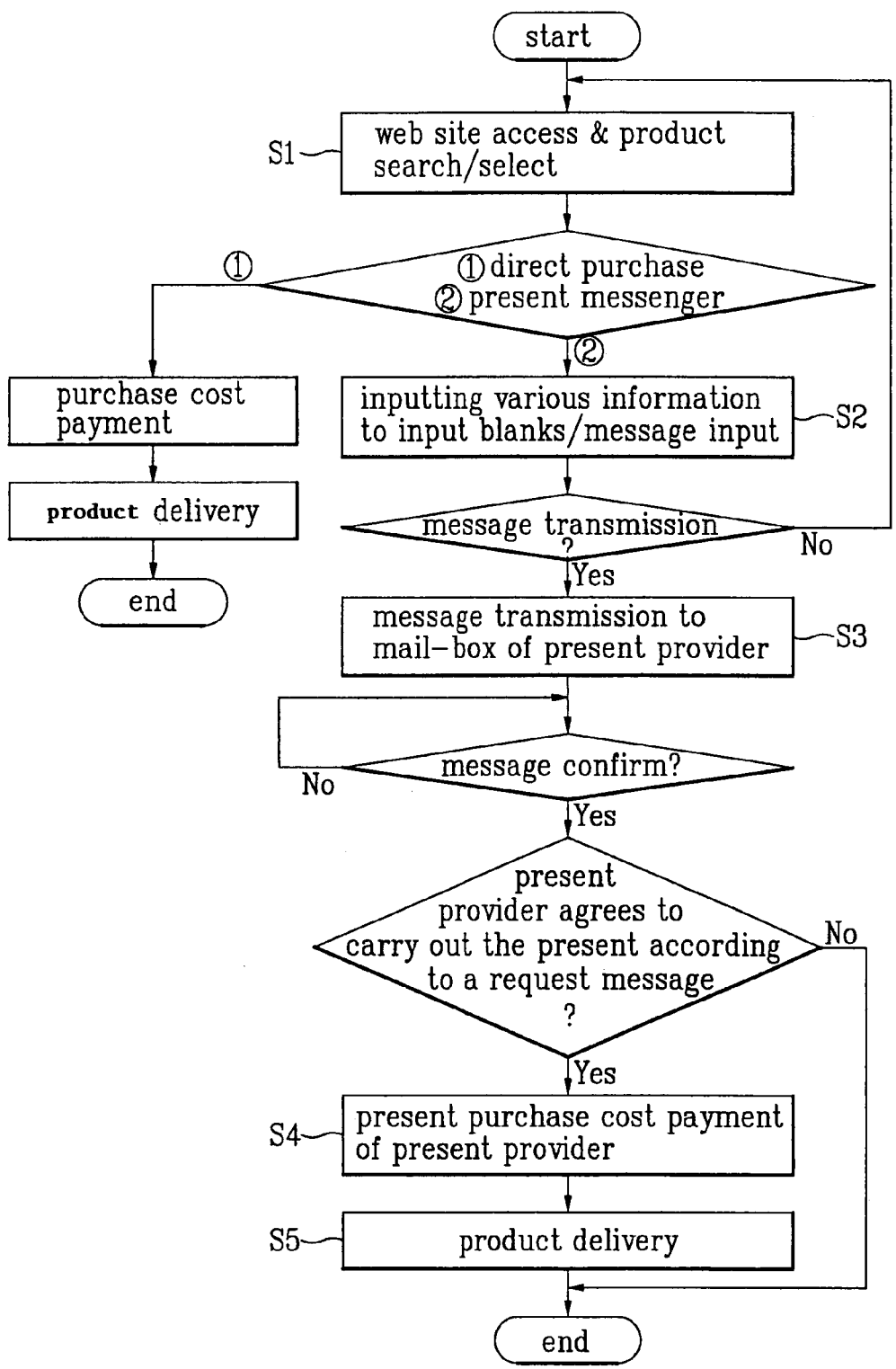
FIG. 2 illustrates a schematic flow chart of the operation procedures of the system according to FIG. 1.
Figure 3A:
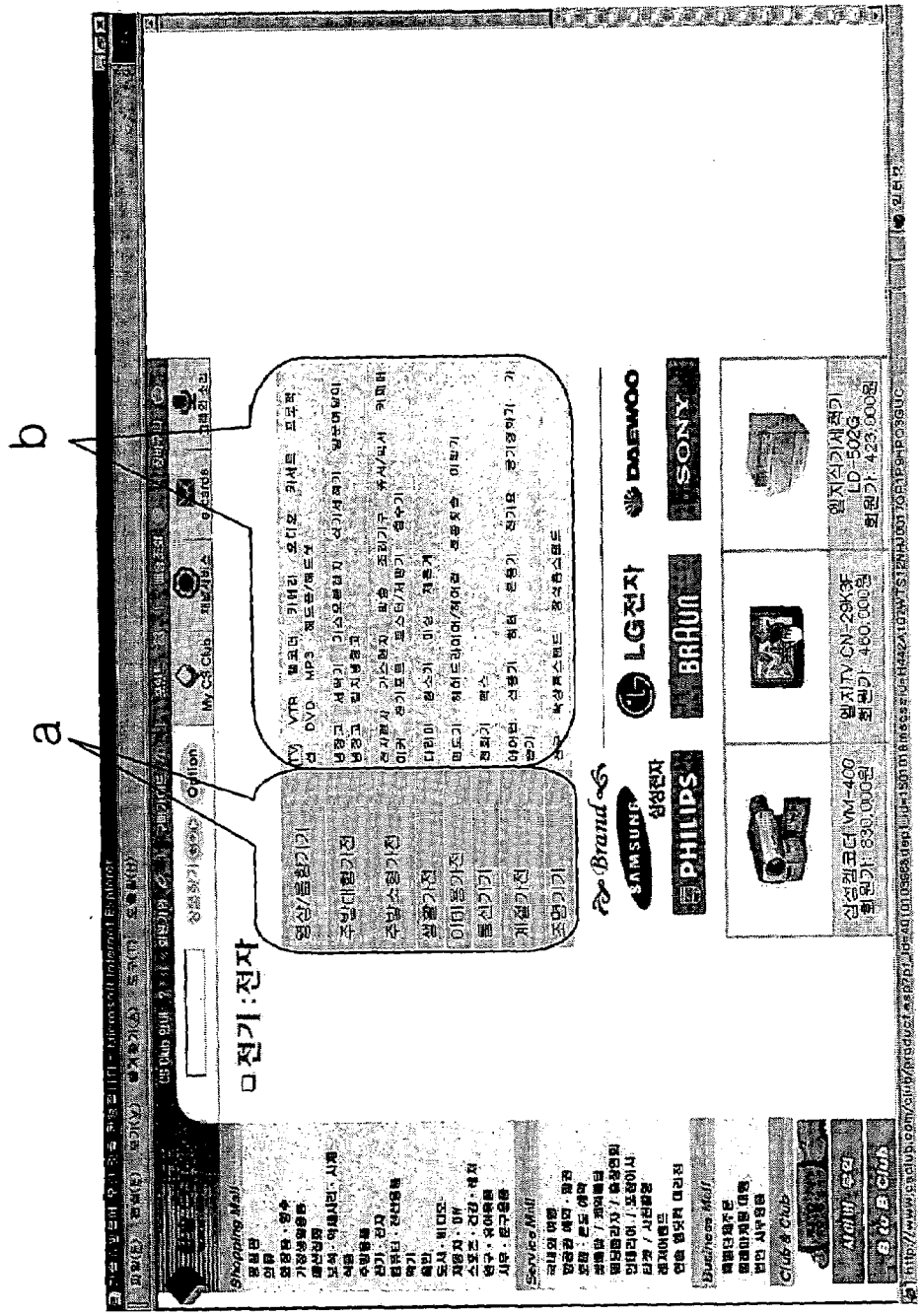
FIGS. 3A to FIGS. 3C illustrate constructions of web pages during the operation of a general present messenger service.
Figure 3B:
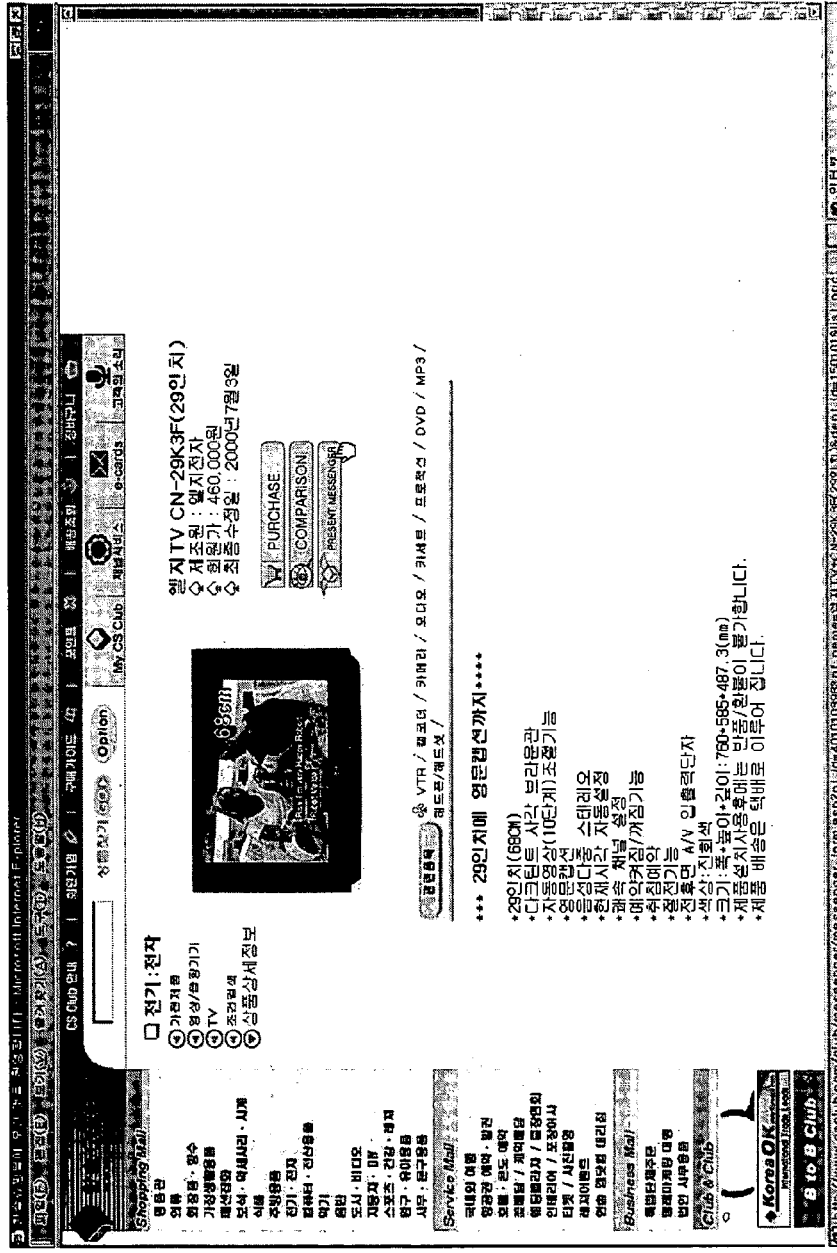
Figure 3C:
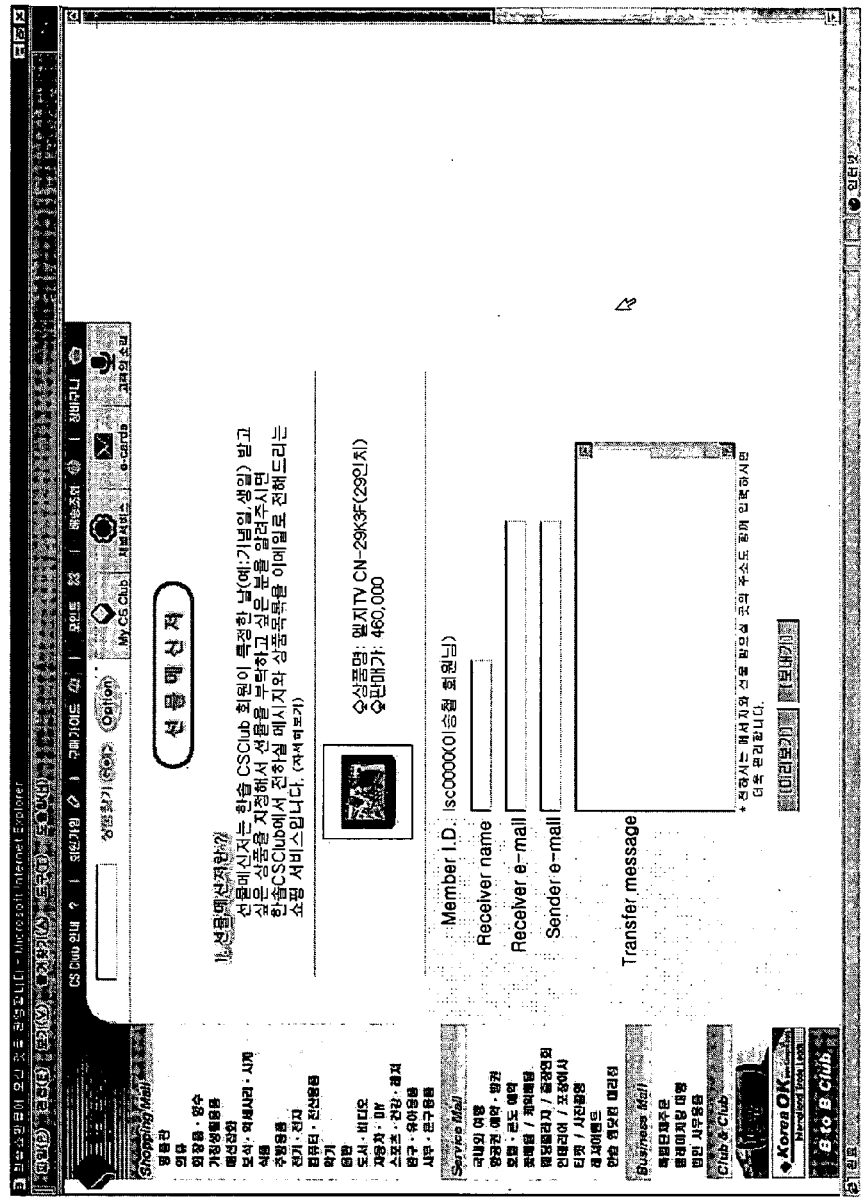
Figure 4:
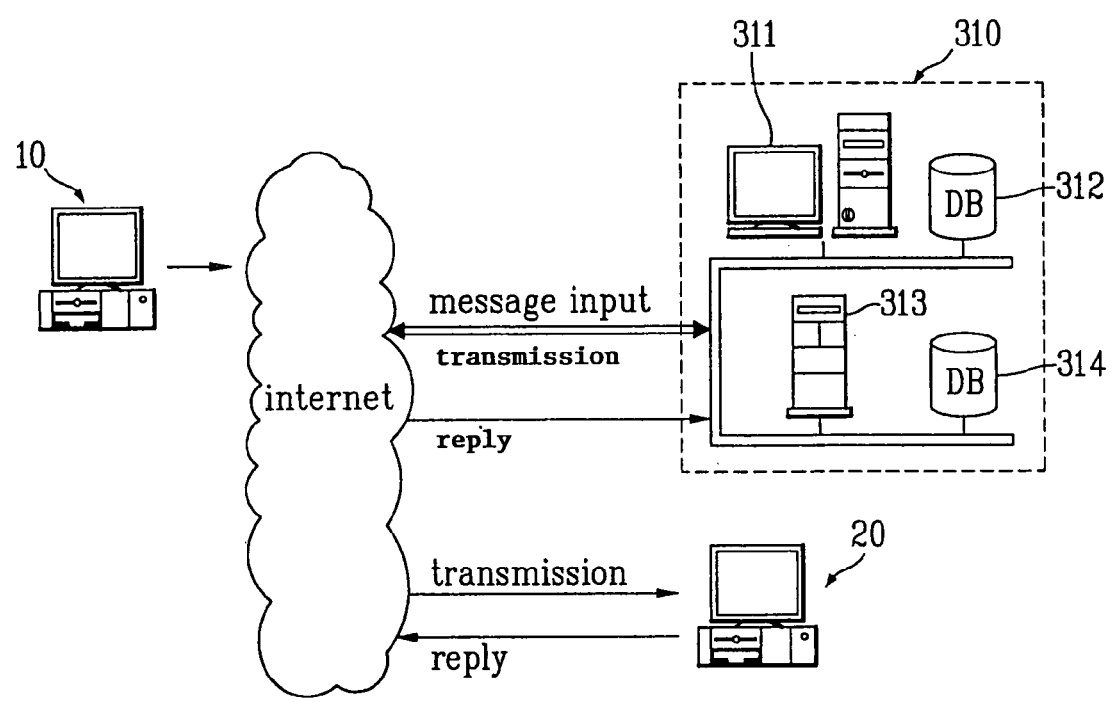
FIG. 4 illustrates a schematic construction of a present messenger service system according to a first embodiment of the present invention.

FIG. 4 illustrates a schematic construction of a present messenger service system according to a first embodiment of the present invention.

Referring to FIG. 4, a present messenger service system according to a first embodiment of the present invention is constructed with a customer PC 10 enabling to gain access to internet, a present provider PC 20 of a present provider designated by a customer, and a network 310 established between the customer PC 10 and the present provider PC 20 and owned by a present messenger service provider.

The network 310 of the present messenger service provider is constructed with a web server 311 for managing a web site, an information storage DB (data base) 312 in which information of various products is stored, a message transfer server 313 transferring a message to the present provider and the customer in connection with the web server 311, and a temporary message storage DB 314 enabling to store a message temporarily in connection with the message transfer server 313.

In this case, the web server 311, which is connected with the information storage DB 312, displays the information of the various products stored in the DB 312. And, a proposal program, which provides a conversation box enabling to select whether the customer purchases the product directly or wants to receive the product as a present when the customer selects the product, is established in the web server 311.

And, the message transfer server 313, when a power of the present provider PC 20 is on, verifies this selection of the customer so as to support a pushing technique for transferring the message sent by the web server 311 to the present provider PC 20.

Moreover, when the power of the present provider PC 20 is off, the temporary message storage DB 314 stores the message until the power of the PC 20 becomes on.

In this case, the forgoing message transfer server 313 and the temporary message storage DB 314 are established on the network 310 of the present messenger service provider as well as constructed in a manner that the transfer of the corresponding message is possible through an additional messenger provider by establishing the DB on the additional messenger provider.

Besides, the temporary message storage DB 314 may be replaced by a predetermined memory of the message transfer server 313 or the like.

Namely, the present messenger service system according to the first embodiment of the present invention proposes that instant verification is possible through a messenger service when the present provider PC is connected to internet without verifying every e-mail for a present request transferred to the present provider.

Figure 5:
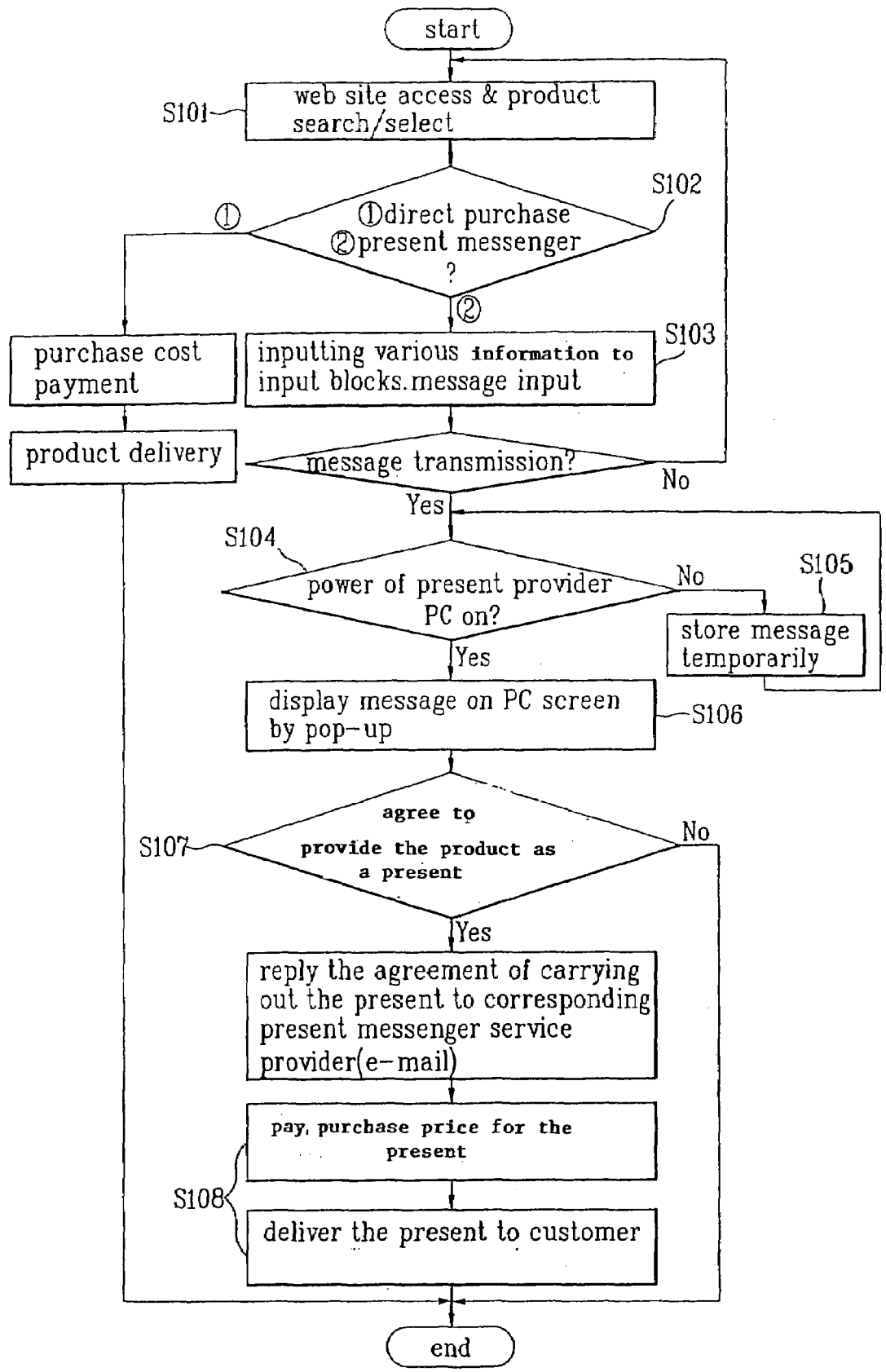
FIG. 5 illustrates a schematic flow chart of the operation procedures of the system in FIG. 4.

FIG. 5 illustrates a schematic flow chart of the operation procedures of the system in FIG. 4, in which the operation procedures of the above-described present messenger service system is explained in detail.

Referring to FIG. 5, in order to operate the present messenger service system, a customer should firstly gain access to the web server 311 constructing the present messenger service system using the customer PC 10. Once the customer PC 10 is linked to the present messenger service system, the web server 311 provides the customer PC 10 with information of various products through web pages. Under this circumstance, the customer searches the displayed respective products and then selects the product to be purchased (S101).

In this case, the customer selects 'a direct purchase' provided that the selected product is to be bought directly or 'a present messenger service' if the corresponding product is chosen to be given to the customer himself as a birthday present for commemorating a special day (S102).

It is preferable that selection buttons and the like are displayed on a web page which is being searched in the present messenger service. Instead, it is also possible that execution of the present messenger service is carried out automatically when the product is selected by the customer on the web page which is established for the present messenger service.

When the present messenger service is selected through this procedure, the customer inputs the required information in the respective input blanks of a conversation box displayed on the web page (S103).

Figure 6:
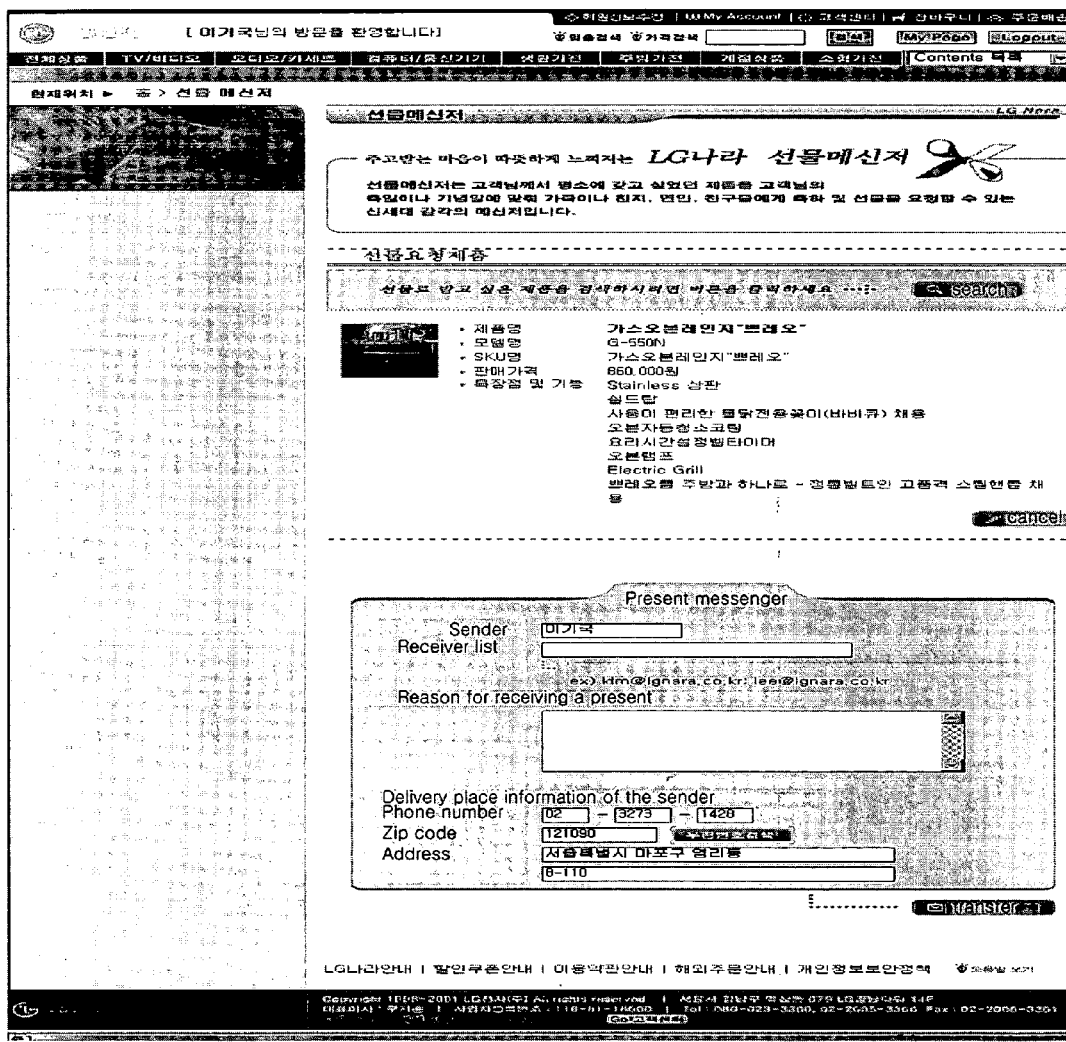
FIG. 6 illustrates an embodiment of a conversation box for transmitting a message during the operation of the system in FIG. 4.

This conversation box is shown in FIG. 6.

Referring to FIG. 6, the matters written on the respective input blanks includes a name of a present provider, a messenger service provider for which the present provider subscribes and a corresponding identification code (ID, etc.) thereof, a name of the present provider or customer, a transfer message and the like.

Besides, the input blanks further includes a blank for inputting information of a delivery place of the customer. The delivery place information includes an address where the customer wishes to receive the present and a telephone number of customer. The delivery place information becomes the major information for the present delivery by the present messenger service provider when the present provider agrees to. In this case, it is preferable that the delivery place information is included in the message transferred to the present provider. Thus, the present provider enables to carry out the delivery without asking the address of the delivery place when providing the customer requesting the present with the present.

Meanwhile, it is preferable that the delivery place information is prepared in advance when the customer becomes a member of the present messenger service provider. In this case, the delivery place information is displayed in the conversation box with input blanks when the customer selects 'a present messenger service'. Thus, the customer enables to correct the delivery place information at need.

Then, the message is transferred to the message transfer server 313 through the web server 311 if the customer selects 'a message transmission'.

In this case, the message transfer server 313 connected with the temporary message storage DB 314 verifies the corresponding identification code of the messenger service provider for which the present provider subscribes in the contents of the transferred message, and then transfers the message to the present provider PC 20 based on this procedure.

When a power of the corresponding PC 20 due to the absence of the present provider, the message transfer server 313 stores the message in the temporary message storage DB 314 until the power of the present provider PC 20 becomes on (S105).

If the power of the present provider PC 20 becomes on, the message transfer server 313 retransfers the message stored in the temporary message storage DB 314 to the present provider PC 20 (S106).

In this case, the message transfer server 313 uses a pushing technique so as to transfer the message to the present provider PC 20 and a popup method so as to display the transferred message on a screen of the present provider PC 20. Therefore, the present provider does not need to carry out the verification of the message. Instead, the present provider enables the message to be transferred as well as acknowledge the message.

The message transfer server 313 verifies whether the power of the present provider PC 20 is on or not by verifying that the present provider PC 20 is connected to the messenger service through internet. In this case, the message transfer server 313 does not verify the on/off state of the present provider PC 20 substantially.

Ascertaining the customer message requesting the present through the above-described procedures, the present provider selects whether to agree to the provision of the present according to the message (S107).

The present provider, when agreeing to the provision of the present, informs the present messenger service provider of the agreement though one of e-mail return, phone conversation, visit and the like, and simultaneously, pays the cost of the corresponding present so as to make the present delivered to the customer (S108).

The reply through the e-mail has a great benefit of intention transfer and bill-payment rather than other methods of returning the agreement of the present provision of the present provider. Namely, the reply through the e-mail enables to reduce the inconvenience that the present provider gains access to the web page of the present messenger service provider again as well as carry out both the purchase intention and bill-payment by providing a web page having a button for selecting an intention about the agreement and an input blank for a bill payment means(for instance, a credit card number or the like) on a message image to be transferred to the present provider.

In this case, the present messenger service provider, when the agreement intention is returned from the present provider, receives the payment by being linked to a network for settlement of accounts of a previously-connected banking facility.

If the present provider disagrees to the present provision and sends this disagreement to the present messenger service provider, the present messenger service provider completes its operation by transferring the corresponding contents to the customer.

Figure 7:
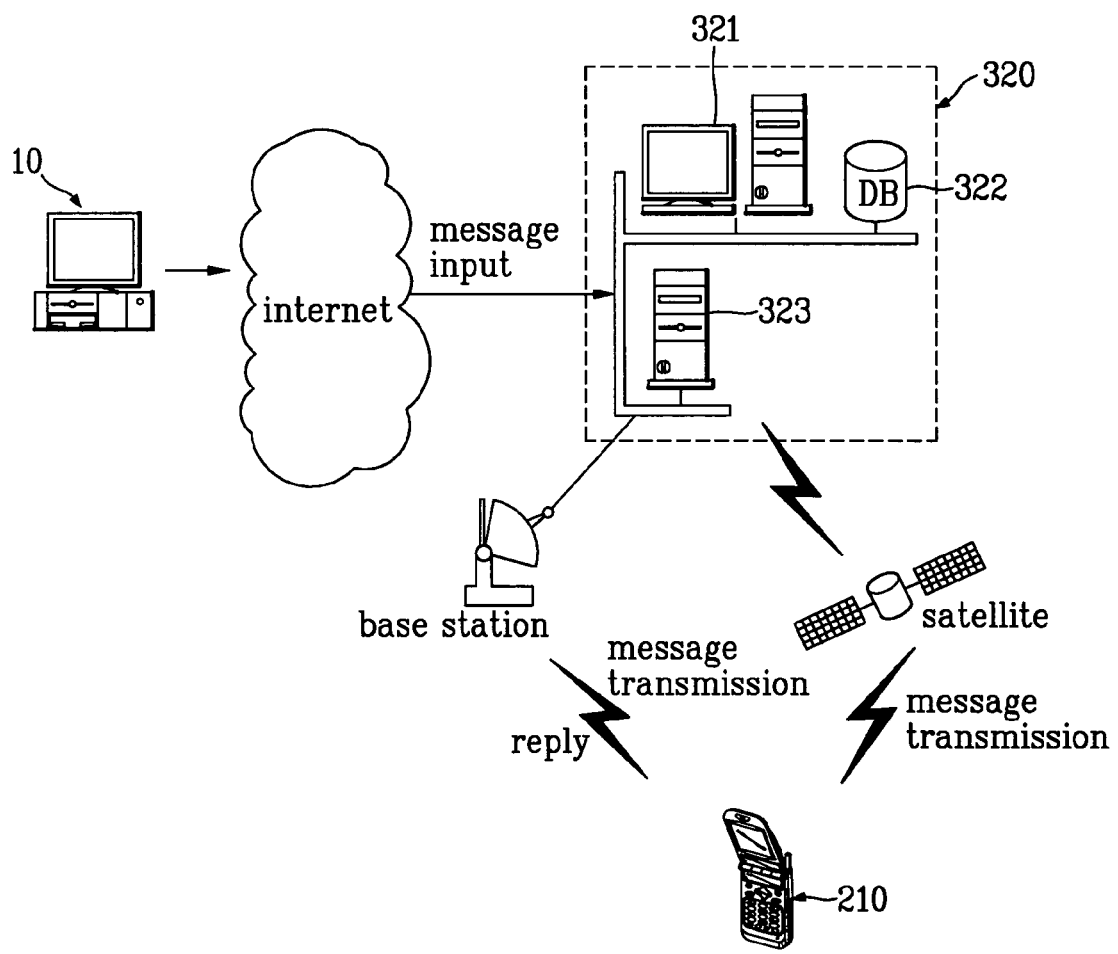
FIG. 7 illustrates a schematic construction of a present messenger service system according to a second embodiment of the present invention.

FIG. 7 illustrates a schematic construction of a present messenger service system according to a second embodiment of the present invention.

Referring to FIG. 7, a network 320 of a present messenger service provider according to a second embodiment of the present invention includes a web server 321 for operating a corresponding web site, an information storage DB 322 in which information of various products is stored, a gateway server 323 in connection with the web server 321 for WAP (wireless application protocol) transmitting a message to a mobile terminal 210 of a corresponding receiver proposed by a customer.

In this case, the web server 321 is connected with the information storage DB 322 and displays the information of the various products stored in the DB 322 on the customer's demand. And, a proposal program is established in the web server 321 wherein the proposal program provides a conversation box enabling the customer to select whether to purchase the product selected by himself in direct or receive the product as a present.

And, the gateway server 323, as known in general, converts data on internet into a form enabling to be ascertained by a mobile phone as well as is equipped with functions of sending applications helpful for a mobile phone environment, sending/receiving mails, transferring information to the mobile phone and the like.

Namely, the present messenger service system according to the second embodiment of the present invention is constructed to solve the problem that the present provider is unable to verify a message of a present request until a power of his PC becomes on. For this purpose, the present messenger service system according to the second embodiment of the present invention proposes that the present provider enables to verify the message exactly through his mobile phone and carry out the execution of the agreement/disagreement about the present request immediately with the message verification.

Operation of the above-constructed present messenger service system is described as follows by referring to FIG. 7.

Figure 8:
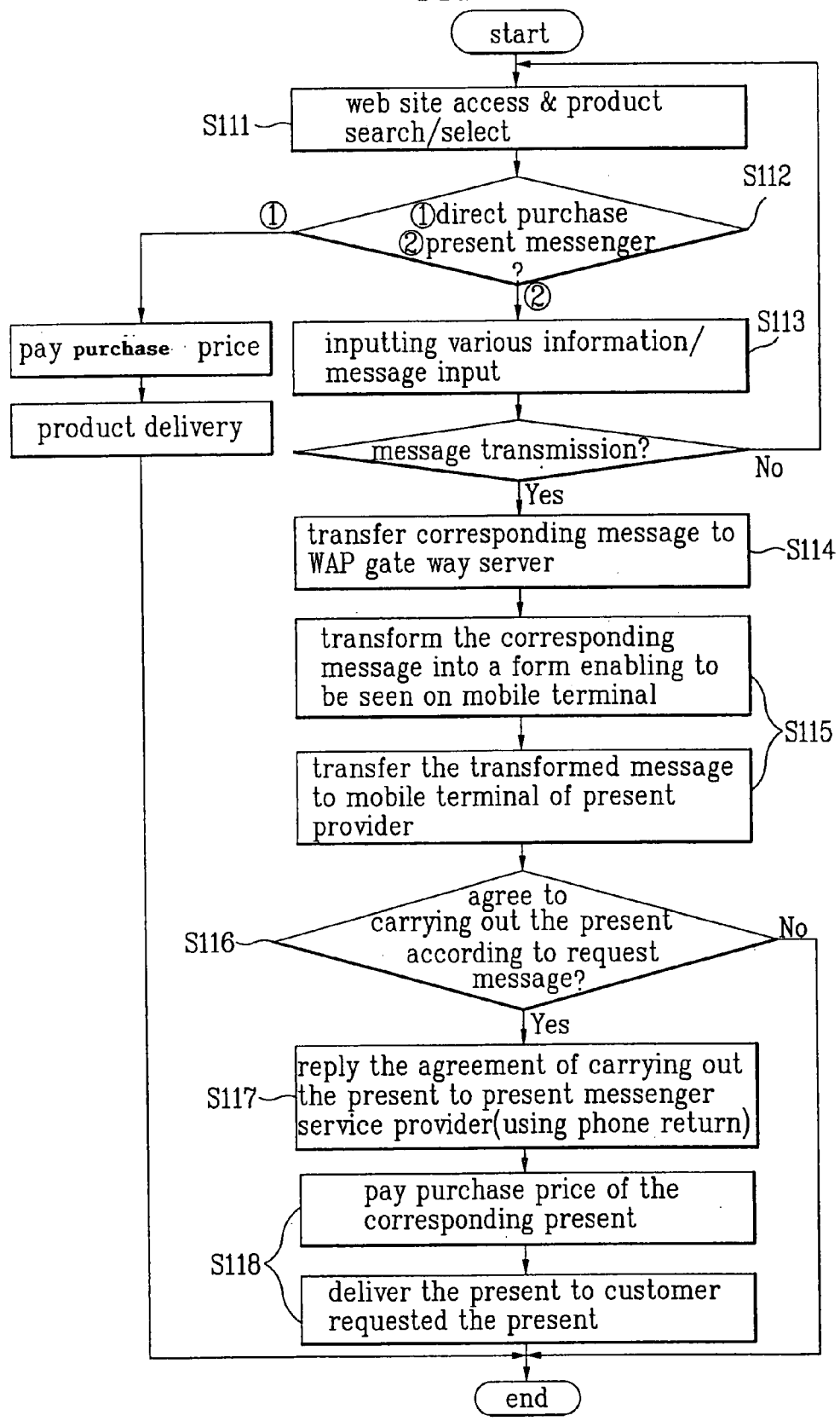
FIG. 8 illustrates a schematic flow chart of the operation procedures of the system in FIG. 7.

FIG. 8 illustrates a schematic flow chart of the operation procedures of the system in FIG. 7.

Referring to FIG. 8, the customer selects one of the various products provided by the web server 321 using the customer PC 10 connected to the network 320 of the service provider (S111).

And, the web server 321 proposes whether the customer purchases the corresponding product in direct or receives the product as a present from other customers (S112).

When the customer selects the messenger service to receive the product as a present, the web server 321 displays a conversation box on a corresponding web page for writing down a present provider name, information (phone number) of a mobile terminal of the present provider, customer name, transfer message and the like.

Figure 9:
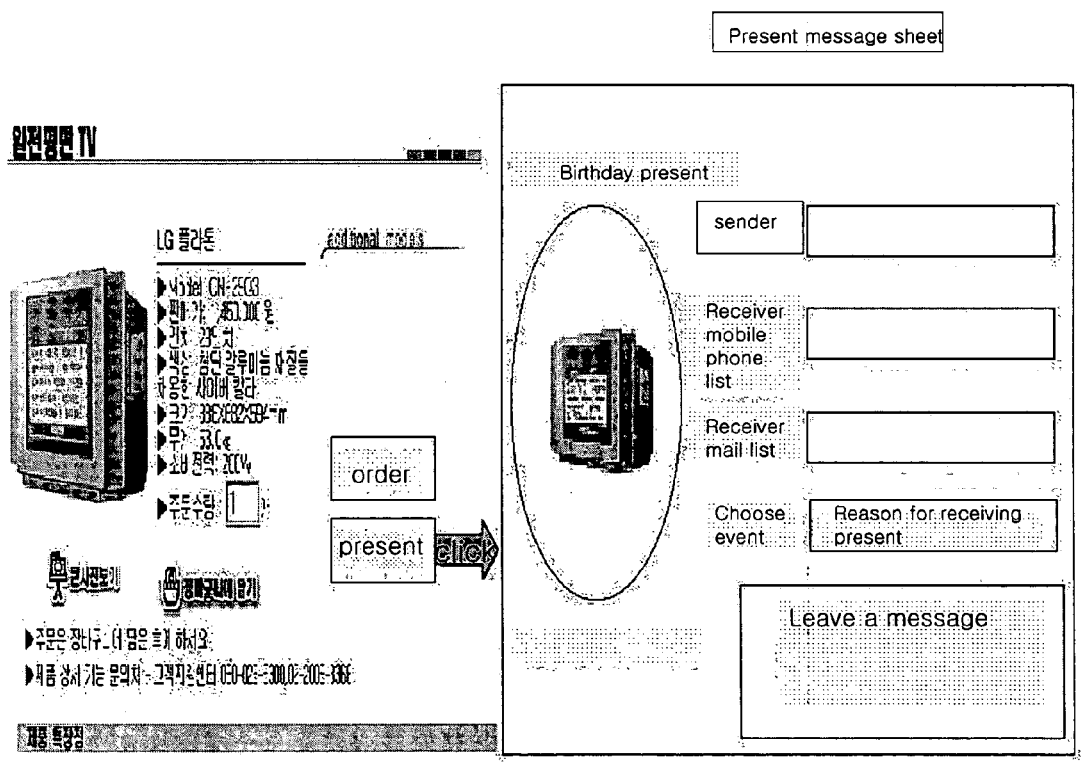
FIG. 9 illustrates an embodiment of a conversation box for transmitting a message during the operation of the system in FIG. 7.

This is shown in FIG. 9. In this case, it is preferable to add an item (not shown in the drawing) for inputting information of a customer's delivery place to the input blanks.

Then, the customer carries out filling out the respective input blanks for the respective items on the conversation box (S113).

After the completion of the above procedure, the web server 321 transmits a message to the WAP gateway server 323 once the customer selects 'message transmission' (S114).

And, the WAP gateway server 323 transforms the message into a form recognized by a mobile terminal 210. Then, the transformed message is transmitted to the mobile terminal of the present provider through a mobile phone network (S115).

The present provider ascertains the message transferred through the above procedure so as to select whether to agree to the present provision in accordance with the message (S116).

When the present provider agrees to the present provision, the present messenger service provider is informed of such contents (S117). A reply of the agreement of the present provision is carried out in a manner that the present provider communicates with the present messenger service provider by returning the phone number of the present messenger service provider included in the corresponding message.

Then, the present provider pays the cost of the present which is already appropriated for the corresponding present with the present messenger service provider, whereby the delivery of the corresponding present to the customer having requested the present is accomplished (S118). In this case, the intention of the consent to the present provision and settlement of accounts are carried out simultaneously in a manner that the present provider informs the present messenger service provider of a payment method and means. Later, the present messenger service provider is paid through a network for settlement of accounts of a banking facility.

However, when the present provide disagrees to the present provision, such information is replied to the present messenger service provider. Subsequently, the present messenger service provider transfers the corresponding information to the corresponding customer so as to complete the operation.

Figure 10:
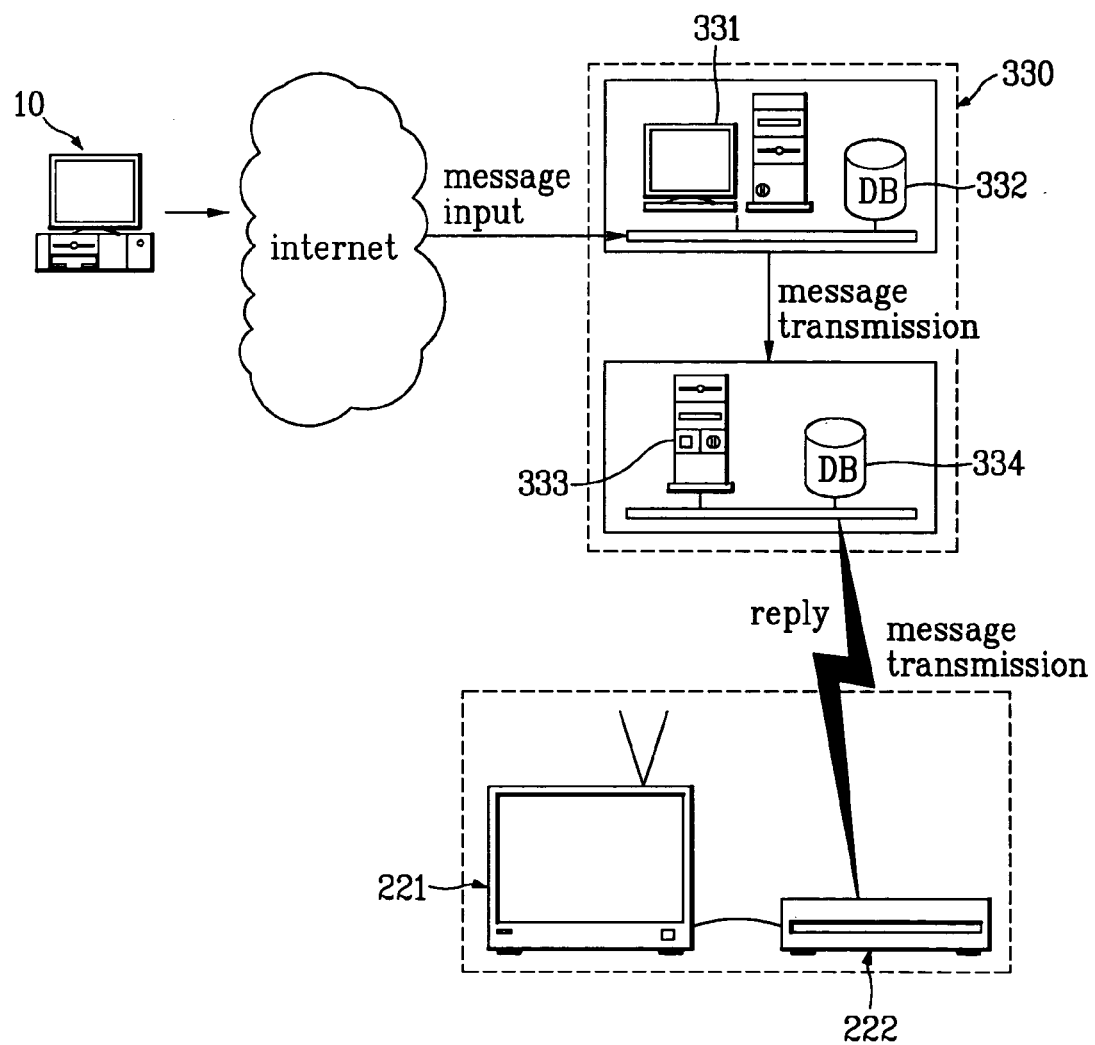
FIG. 10 illustrates a schematic construction of a present messenger service system according to a third embodiment of the present invention.

FIG. 10 illustrates a schematic construction of a present messenger service system according to a third embodiment of the present invention.

Referring to FIG. 10, a network 330 of a present messenger service provider according to a third embodiment of the present invention is mainly constructed with a web server 331 for operating a corresponding web site, an information storage DB 332 storing information of various products, a relay server 333 relaying a message transferred through the web server 331 so as to display the message on a screen of an internet TV 221 of a present provider in connection with the web server 331, and a temporary message storage DB 334 for storing a message therein in connection with the relay server 333.

In this case, the web server 331 is connected with the information storage DB 332 and displays the information of the various products stored in the DB. And, a proposal program is established in the web server 331 so as to provide a conversation box selecting whether the product selected by the customer is purchased in direct or given as a present.

The internet TV 221 is a web-TV 221 making a TV as an internet user interface as well as connected with a set-top box having a web-browser and TCP/IP (transmission control protocol/internet protocol).

The relay server 333 supports a pushing technique enabling to transfer a message transferred from the web server 331 to a set-top box 222 of the present provider by verifying that a power of the web-TV 221 of the present provider is on.

The temporary message storage DB 334, when the power of the web-TV 221 of the present provider is off, stores the message temporarily until the power of the web-TV becomes on.

In this case, the relay server 333 and temporary message storage DB 334 may be established on an additional web-TV service provider as described in the first embodiment of the present invention.

Besides, a memory of the relay server 333 as well as an auxiliary data storage space realized in the set-top box 222 may be used as a means for storing the message temporarily.

Namely, the present messenger service system according to the third embodiment of the present invention, considering that a web-TV is rising abruptly, enables a plurality of web-TV viewers as well as the present provider to watch the corresponding message. Therefore, advertisement effect of the corresponding site is maximized.

Operation of the above-constructed present messenger service system is described in detail as follows by referring to FIG. 10.

Figure 11:
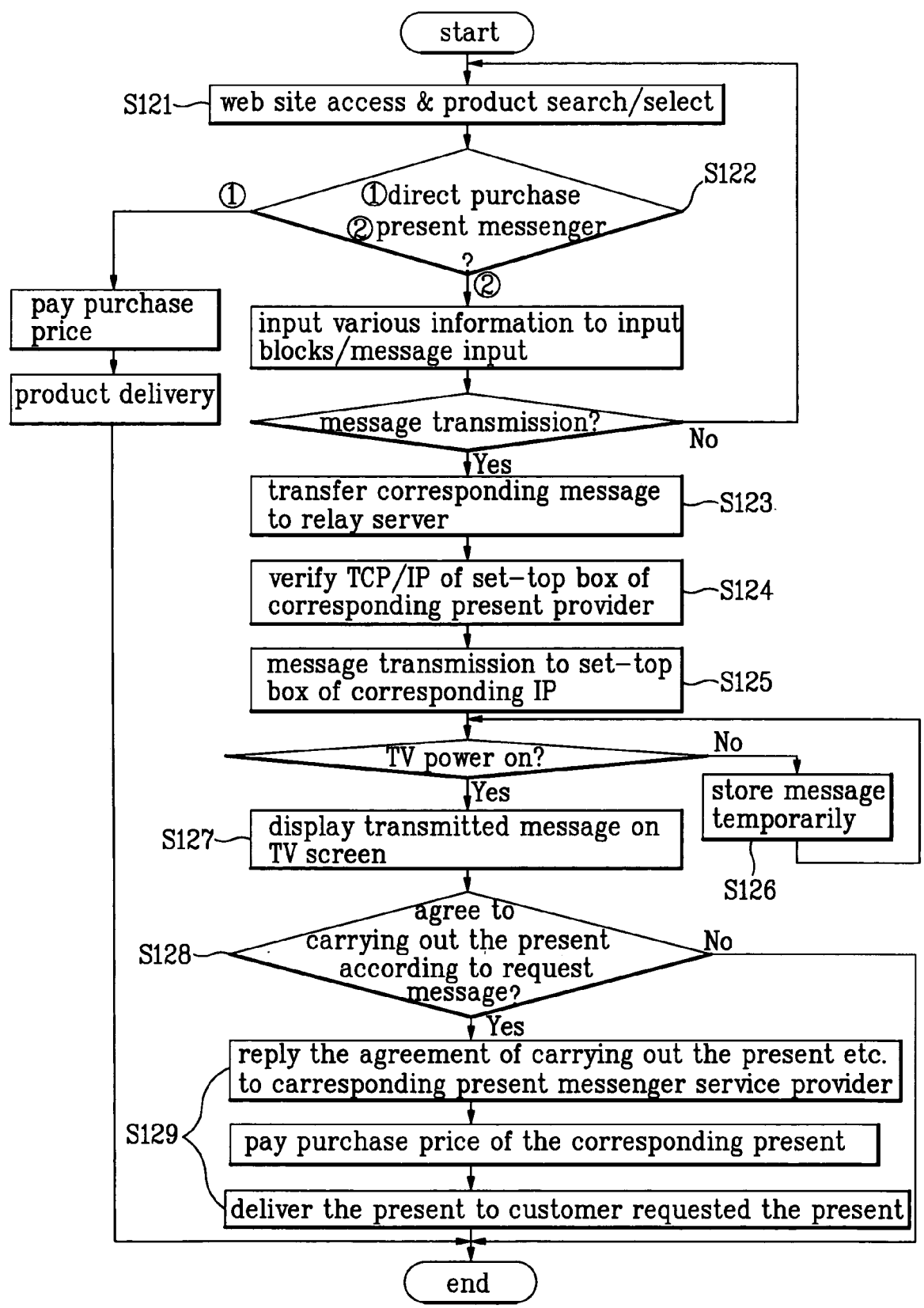
FIG. 11 illustrates a schematic flow chart of the operation procedures of the system in FIG. 10.

FIG. 11 illustrates a schematic flow chart of the operation procedures of the system in FIG. 9.

Referring to FIG. 11, the customer selects one of the various products provided by the web server 331 using the customer PC 10 connected to the network 330 of the present messenger service provider (S121).

And, the web server 331 of the present messenger service network proposes whether the customer purchases the corresponding product in direct or receives the product as a present from other customers (S122).

When the customer selects the messenger service to receive the product as a present, the web server 331 displays a conversation box on a corresponding web page for writing down a present provider name, information (address, phone number, identification address of the web-TV, etc.) of the present provider, customer name, transfer message and the like.

In this case, it is also preferable to add an item for inputting information of a customer's delivery place to the input blanks. Thus, the present provider enables to provide the customer requesting the present with the present in direct by having the information of the delivery place included in the message transferred to the present provider.

Then, the customer carries out filling out the respective input blanks for the respective items on the conversation box. After the completion of filling out the respective input blanks, the web server 331 transmits the message to the relay server 333 once the customer selects 'message transmission' (S123).

In this case, based on the information about the present provider in the contents of the message, the relay server 333 recognizes a TCP/IP address of the set-top box 222 in the web-TV 221 of the present provider (S124).

Then, the relay server 333 transfers the message to the corresponding web-TV 221 through the set-top box 222 of the recognized address (S125).

When a power of the web-TV is off during the message transmission, the message transferred from the web-server 331 to the relay server 333 is temporarily stored in the temporary message storage DB 334 (S126).

At the same time, the relay server 333 keeps on confirming that the power of the web-TV 221 of the present provider is on.

In this case, the relay server 333 recognizes the 'on/off' state of the web-TV power by carrying out bi-directional communication with the set-top box 222 of the web-TV.

Namely, the state of the web-TV connected with the set-top box 222 is easily apprehended in a manner that the relay server 333 carries out mutual communication continuously with the set-top box by being connected with the set-top box 222.

When the power of the web-TV 221 is on by the above procedure, the relay server 333 transfers the message stored in the temporary message storage DB 334 to the web-TV 221 of the present provider (S127).

Then, the present provider ascertains the message transferred through the above procedure so as to select whether to agree to the present provision in accordance with the message (S128).

When the present provider agrees to the present provision, the present messenger service provider is informed of such contents as soon as the delivery of the corresponding present to the customer having requested the present is carried out by having the cost of the corresponding present paid by the present provider (Sl29).

Preferably, a reply of the agreement of the present provision is carried out in a manner that the process of transferring the message to the web-TV 221 is carried out reversely. Otherwise, the reply may be carried out by communication, e-mail, direct visit or the like.

In this case, a reply method of the agreement of the present provision is carried out by using the web-TV is more excellent in carrying the intention and settlement of accounts than any other methods. Namely, both the purchase intention and bill-settlement are carried out by providing a message image received by the present provider with a button for selecting an intention about the agreement and together with an input blank for a bill payment means (for instance, a credit card number or the like) on the message image. And, the present provider enables to propose his intention of agreement, a method of settlement of accounts and means to the present messenger service provider on real-time by controlling a touch-screen or remote controller. Therefore, it is able to reduce the inconvenience that the present provider makes use off another communication means or gains access to the web page of the present messenger service provider again in order to carry out the above procedure as well as carry out the settlement of accounts for the cost simultaneously with the purchase intention.

In this case, the present messenger service provider, when the agreement intention is returned from the present provider, is paid by being linked to the network for settlement of accounts of the previously-connected banking facility.

If the present provider disagrees to the present provision and sends this disagreement to the present messenger service provider, the present messenger service provider completes its operation by transferring the corresponding contents to the customer.

Besides, The forgoing embodiments are merely exemplary and are not to be construed as limiting the present messenger service system of the present invention.

Figure 12:
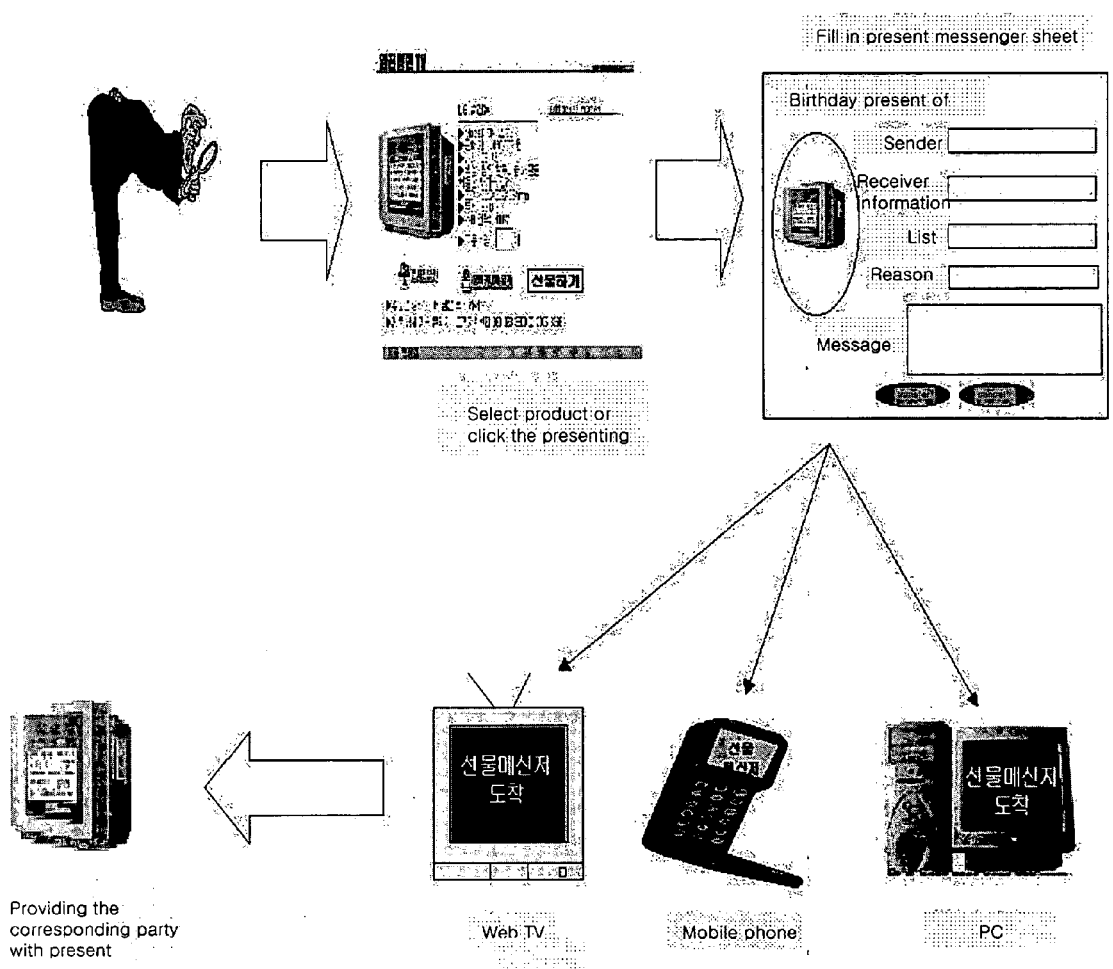
FIG. 12 illustrates a schematic construction of operating a present messenger service system according to the present invention.

Namely, the message transfer of the present invention may be carried out by the e-mail of the related art. And, the message transfer is accomplished more reliably by, as shown in FIG. 12, combining all the above-described embodiments of the present invention together so as to carry out the service.

It is also easily understood that the customer requesting the present enables to carry out the present request using a mobile terminal or a web-TV as shown in the respective embodiments of the present invention without gaining access to the web-server of the present messenger service provider.

The present provider enables to receive the message of the customer requesting the present since the present messenger service is carried out not only by the e-mail in the related art but also by various communication means on real-time.

Accordingly, the present invention enables the message to be transferred stably and improves the credibility of the customer by ascertaining the message through various communication means without having the present provider check his mail.

As the message is carried through the means available for bi-directional communication, the present provider enables to make an order for the corresponding present as soon as receives the message. Therefore, the present provider feels convenience for providing the present and the sales of the present messenger service provider rise because of the convenience of the present provision order.

Moreover, the present invention enables a plurality of web-TV viewers as well as the present provider to ascertain the contents of the message, whereby advertisement effect of the corresponding present messenger service provider is increased.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of operating a present messenger service system comprising:
   providing information of products through a web page to a customer terminal when a customer gains access to a web server of a present messenger service provider;
   verifying whether the customer has selected to purchase at least one of the products displayed on the web page directly or to receive the product as a present;
   sending a request to the customer terminal for information including a personal identification address of a messenger service to which a present provider subscribes and a message to be transferred to the present provider when the customer has selected to receive the product as the present;

storing the message to be transferred to the present provider in a temporary message storage of the present messenger service provider when a present provider PC of the present provider is not connected to a same network to which the web server of the present messenger service provider and the temporary message storage of the present messenger service provider are connected, the network being provided by the present messenger service provider and the network including a web server to manage a website of the present messenger service provider and a message transfer server, separate from the web server, to transfer messages to the present provider, the message transfer server to determine whether the present provider PC is connected to the same network by verifying that the present provider PC is connected to a messenger service through the Internet; and transmitting the message directly to the present provider PC when the customer finishes inputting said information, wherein transmitting the message includes the message transfer server transferring the message stored in the temporary message storage of the present messenger service provider to the present provider PC when the present provider PC becomes connected to the same network to which the web server and the temporary message storage of the present messenger service provider are connected, and wherein the message is displayed on a screen of the present provider PC using a pop-up method; and delivering the product to the customer when the present provider agrees to provide the product as a present after verification of the message.

2. The method of claim 1, wherein the request sent to the customer terminal requests the customer to input delivery place information of the customer, and wherein the message including the delivery place information of the customer is transferred to the present provider PC by the message transfer server.

3. The method of claim 1, wherein the web server of the present messenger service provider displays delivery place information of the customer which was previously inputted and wherein the message including the delivery place address information of the customer is transferred to the present provider PC by the message transfer server.

4. The method of claim 1, wherein the present provider selects an intention for the agreement on a message image transferred to the present provider PC as soon as payment means is specified, and wherein a purchase is made immediately after the present messenger service provider receives a reply from the present provider.

5. A method of operating a present messenger service system comprising:

providing information of products through a web page to a customer terminal when a customer gains access to the web server of a present messenger service provider;

verifying whether the customer has selected to purchase at least one of the products displayed on the web page directly or to receive the product as a present;

sending a request to the customer terminal for information of a web-TV of a present provider and a message to be transferred to the present provider when the customer has selected to receive the product as a present;

storing the message to be transferred to the present provider in a temporary message storage of the present messenger service provider when power of the web-TV of the present provider is off;

transferring the information of the web-TV and the message to a relay server of the present messenger service provider when the customer finishes inputting said information, wherein the transferring further includes the relay server of the present messenger service provider transferring the message stored in the temporary message storage of the present messenger service provider to the web-TV of the present provider when the power of the web-TV is verified to be on by the relay server;

verifying, in the relay server of the present messenger service provider, an address (TCP/IP: transmission control protocol/internet protocol) of the web-TV of the present provider in order to display the message on the web-TV of the present provider; and delivering the product to the customer when the present provider agrees to provide the product as a present after verification of the message.

6. The method of claim 5, wherein the request sent to the customer terminal requests delivery place information of the customer, and wherein the message including the delivery place information of the customer is transferred to the present provider web-TV.

7. The method of claim 5, wherein in the request, the web server of the present messenger service provider displays delivery place information of the customer which was previously inputted, and wherein the message including the delivery place information of the customer is transferred to the present provider.

8. The method of claim 5, wherein delivering the product comprises the present provider selecting an intention for the agreement on a message image transferred to the present provider as soon as a payment means is specified, and wherein a purchase is made immediately after the present messenger service provider receives a reply from the present provider.

9. A method of operating a present messenger service system comprising:

providing information of products through a web page to a customer terminal when a customer gains access to a web server of a present messenger service provider;

verifying whether the customer has selected to purchase at least one of the products displayed on the web page directly or to receive the product as a present;

sending a request to the customer terminal for information including a personal identification address of a messenger service to which a present provider subscribes and a message to be transferred to the present provider when the customer has selected to receive the product as a present; and transmitting the message directly to the present provider when the customer finishes inputting said information, wherein transmitting the message comprises:

storing the message to be transferred to the present provider in a temporary message storage of the present messenger service provider when the present provider is not connected to a same network to which the web server and the temporary message storage of the present message service provider are connected, the network being provided by the present messenger service provider and the network including a web server to manage a website of the present messenger service provider and a message transfer server to transfer messages to the present provider, the message transfer server to determine whether the present provider is connected to the same network by verifying that the present provider is connected to a messenger service through the Internet, the message transfer server transferring the message stored in the temporary message storage of the present messenger service provider to the present provider when the present provider becomes connected to the same network to which the web server and the temporary message storage are connected, delivering the product to the customer when the present provider agrees to provide the product as a present after verification of the message, and displaying the message on a screen of the present provider.

* * * * *